UNITED STATES PATENT OFFICE.

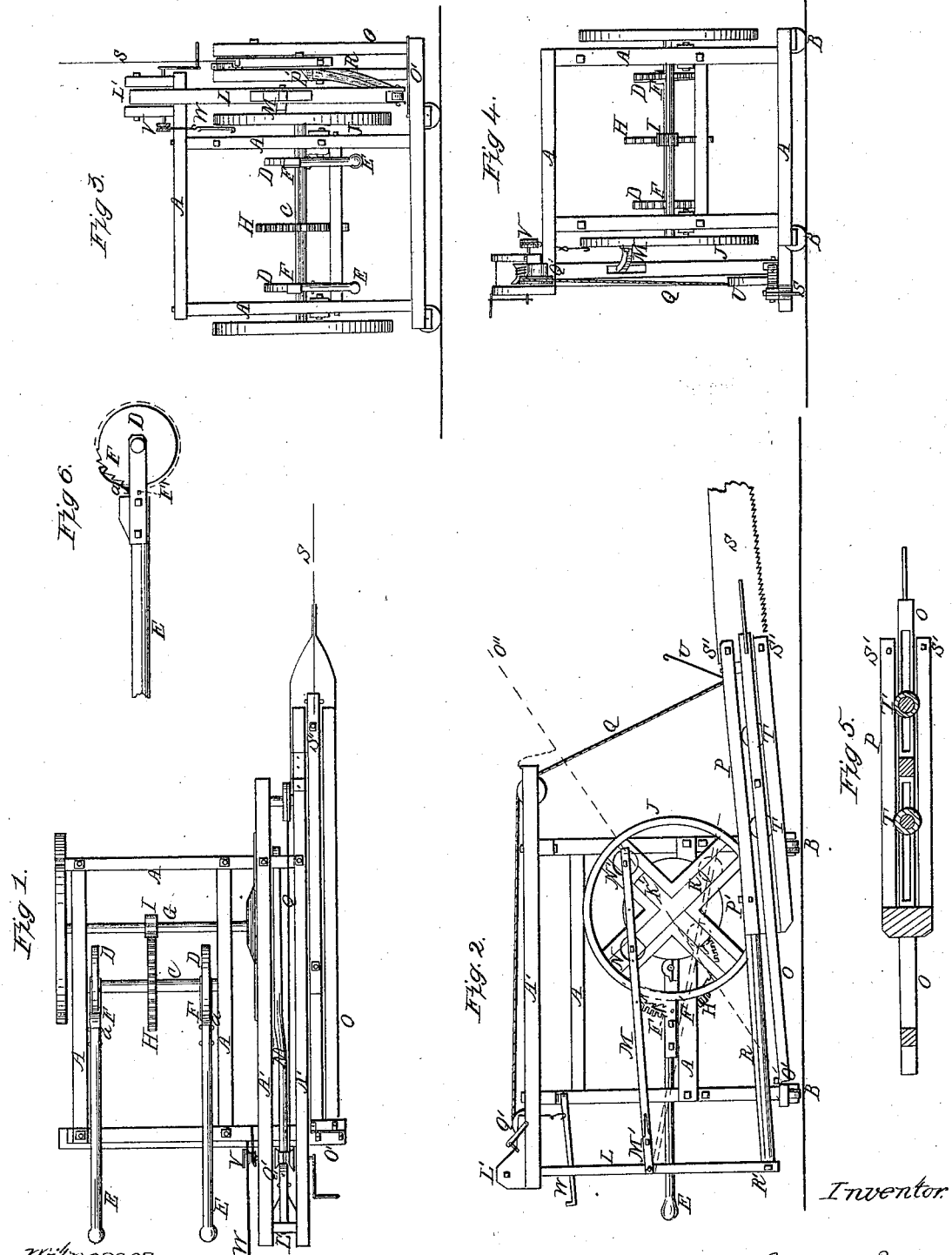

WILLIAM F. VEBER, OF PERRYSBURG, OHIO.

IMPROVED WOOD-SAWING MACHINE.

Specification forming part of Letters Patent No. 40,438, dated October 27, 1863.

*To all whom it may concern:*

Be it known that I, WILLIAM F. VEBER, of Perrysburg, in the county of Wood and State of Ohio, have invented new and useful Improvements in Wood-Sawing Machines; and I do hereby declare that the following is a full and complete description of the construction and operation of the same, reference being had to the accompanying drawings, making part of this specification, in which—

Figure 1 is a top view. Fig. 2 is a side elevation. Figs. 3 and 4 are end views, and Figs. 5 and 6 are detached sections.

Like letters refer to like parts.

My invention relates, first, to the arrangement of devices for obtaining motion and the mode of applying power; second, to the devices for removing friction from the pitman; and, third, in the devices for graduating the cut of the saw upon the log.

The frame of the machine is shown at A A A. This is mounted on rollers or wheels B, by means of which the machine is moved lengthwise of the log to be sawed, the wheels moving on ways prepared for that purpose. A driving-shaft, C, is placed transversely across the frame and secured in boxes C', one only of which is shown in Fig. 2. At the ends of this shaft I attach ratchet-wheels D D. These wheels are operated by means of pawl-levers E E and pawls F F.

The levers E E have their fulcrums upon the shaft C, the end being divided, thus embracing the ratchet-wheel. The pawl F is secured between the branches of the lever by a pin, F', and is pressed against the ratchet-wheel by a spring, a. These parts are shown detached in Fig. 6.

Immediately in front of the shaft C, I place the shaft G, which is also transverse to the frame and parallel to the shaft C. The shaft C carries in its middle the cog-gear H, and this gear works into a pinion, I, on the middle of the shaft G, and by which the shaft G receives an accelerated motion, for the pinion I is only one-third the diameter of the wheel H. On the right-hand end of the shaft G, as seen in Fig. 3, I place a crank-wheel, J. This wheel is made similar to a balance-wheel, with four double-arms. These arms are so formed as to constitute a double groove, K K', which cross the face of the wheel at right angles at its center.

L represents a pendent arm attached by a pin-joint to the projecting ends of the timbers A' A' at L'. This pendent arm extends nearly to the ground in order to form connection with the pitman, as hereinafter set forth.

M represents the connecting-rod, which is attached to the middle of the arm L by an articulating pin or joint, as seen at M'. The opposite end is connected to the crank-wheel J by means of two friction-rollers, N N', attached to the connecting-rod at such distances that when one occupies the point of intersection of the grooves K K' the circumference of the other will nearly reach the inner surface of the rim of the wheel J. When the crank-wheel J is caused to rotate, the roller N will traverse the entire length of the groove K, while the roller N' will in like manner traverse the whole length of the groove K', the rollers passing each other twice at every revolution of the wheel J; hence the connecting-rod M has two motions forward and two backward for every single revolution of the wheel J.

O represents a frame for guiding the saw-sash P. This frame is hinged to the base-timber, A, as shown at O', and can be raised to the position indicated by the dotted line O" in Fig. 2. This is done by means of a cord, Q, and pulley and crank Q', and carries with it the saw, as hereinafter specified.

The saw-sash P P is connected to the arm L by means of the pitman R, which is united to the lower end of the arm L by a pin-joint, as seen at R', and to the saw-sash by means of a pin-joint seen at P'. The saw-sash P P is composed of two bars, which are about four inches apart and parallel to each other, to the forward end of which the saw S is attached by a bolt through each, as shown in Figs. 1, 3, and 5 at S'.

For the purpose of causing the saw-sash to move with the least possible amount of friction, I mount it upon friction-rollers T T, the journals of which work in a groove, T', in the frame O. The whole saw-sash and the frame in which it glides can be raised by means of the cord Q and pulley and crank Q', and when raised to the position shown by the dotted line O" a hook, U, attached to the free end of the saw-sash frame, takes hold of a notch in the end of the timber A' and holds it fast.

A pulley, V, Figs. 3 and 4, upon the end of the shaft of the pulley Q' serves as a counterbalance for the weight of the saw by means of the cord V', that winds around the pulley, one end of which is attached to the frame and the other end to the lever W. By weighting this lever the friction of the cord upon the pulley removes more or less of the weight of the saw upon the log, according to the position of the weight upon the lever. The machine is operated by means of the levers E E. When the machine is in position, with the saw resting upon the log, the operator takes hold of the levers E E and works them rapidly. A rotary motion is given to the crank-wheel J. This gives two strokes to the saw to one revolution of the wheel. The pressure of the saw upon the log is governed by the weighted lever W.

What I claim as my improvement, and desire to secure by Letters Patent, is—

1. The levers E, pawls F, and ratchet-wheels D, in combination with the crank-wheel J and saw-sash P, the several parts being constructed and operating as and for the purpose specified.

2. The rollers T T, in combination with the saw-sash P, when arranged and operating as and for the purpose described.

3. The brake-pulley V and lever W, in combination with the cord Q and frame O, for the purpose herein set forth.

WM. F. VEBER.

Witnesses:
   J. BRAINERD,
   W. H. BURRIDGE.